Figure 1:
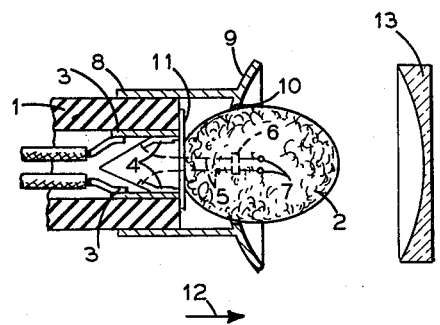

Nov. 5, 1963    H. BÖHME    3,109,595
FLASHBULB UNIT FOR PHOTOGRAPHIC CAMERAS
Filed Sept. 22, 1961

INVENTOR.
Herman Böhme
BY Blum, Moscovitz,
Friedman and Blum
ATTORNEYS

3,109,595
FLASHBULB UNIT FOR PHOTOGRAPHIC CAMERAS
Hermann Böhme, Leopoldstr. 23, Braunschweig, Germany
Filed Sept. 22, 1961, Ser. No. 139,967
Claims priority, application Germany Sept. 23, 1960
6 Claims. (Cl. 240—1.3)

This invention relates to flashbulb units for use with photographic cameras and, more particularly, to an improved, extremely compact flashbulb unit having reflecting and image field illumination properties fully equivalent to those of known much larger flashbulb units.

The invention is particularly directed to flashbulb units of the type in which the longer axis of the flashbulb is substantially coaxial with the axis of the reflector. In known units of this type, the size of the reflector determines the overall dimensions of the unit, and when the flashbulb is disposed completely within the forward face of the reflector, the reflectors have dimensions of such magnitude that the units become very unhandy.

The present invention is directed to a flashbulb unit in which these difficulties are avoided and a unit of the smallest possible dimensions, and thus one with the smallest possible reflector, is provided. Nevertheless, the unit of the present invention has a reflecting or light amplification factor, and a uniformity of image field illumination, which are fully equivalent to those of the known large reflectors.

In accordance with the present invention, the flashbulb is mounted in the reflector in such a manner that the plane of the cutout in the reflector, provided for insertion of the flashbulb into its socket, intersects the flashbulb at substantially the longitudinal position of the usual electrode support means within the flashbulb envelope, or alternatively between this means and the "firing" or discharge tips of the electrode. In addition, at least part of the envelope of the flashbulb projects rearwardly of the reflector so as to extend from the convex rear surface thereof. By providing a relatively slight curvature to the reflector, its lateral dimensions or diameter may be so preselected as to be about double the maximum lateral dimensions of the flashbulb envelope.

Figure 2:
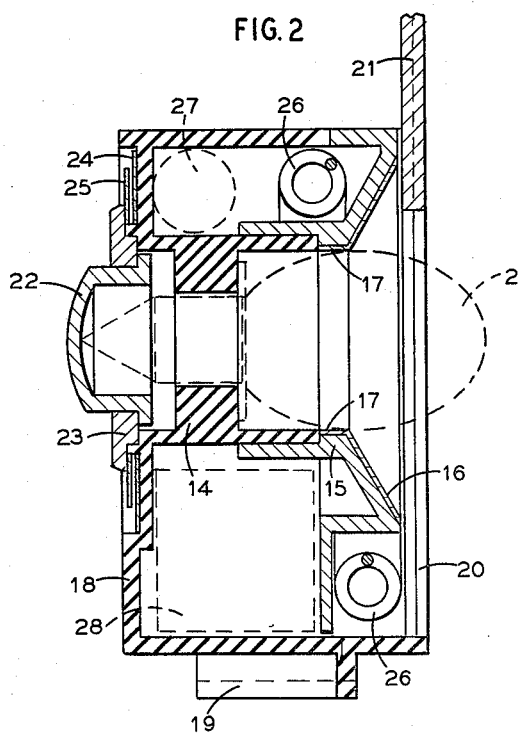

For an understanding of the principles of the invention, reference is made to the following description of typical embodiments thereof as illustrated in the accompanying drawings. In the drawings:

FIG. 1 is an axial sectional view through a flashbulb, socket, associated reflector, and other elements forming part of a flashbulb unit embodying the invention; and FIG. 2 is an axial sectional view through a modified form of flashbulb unit embodying the invention.

Referring to FIG. 1, a socket or holder 1 for a flashbulb 2 is illustrated as made of dielectric material. Electric contacts 3 within the socket 1 are electrically connected with contacts 4, on the base of the flashbulb 2, when the latter is inserted in the socket 1. The contacts 4 are the terminals of electrodes 5 of the flashbulb, and project out of the flashbulb base. Electrodes 5 are supported in properly laterally spaced relation within the flashbulb envelope by a suitable mount, or support, such as a glass bead 6, and terminate in electrode tips 7 having the active material of the flashbulb disposed therebetween.

A sleeve 8 is supported on the socket 1, engaging the outer surface thereof, and sleeve 8 supports a reflector 9. Sleeve 8 may be fixedly secured to socket 1, or may be axially displaceable relative thereto. Where socket 1 and sleeve 8 have cylindrical cross sections, the sleeve 8 may be mounted for angular displacement on the socket 1 about the common axis of the socket and the sleeve. In the latter case, selected angular positions of sleeve 8 relative to socket 1 can be determined by means of click-stop devices.

Reflector 9 is formed with a cutout or aperture 10 which is not substantially larger than required for the purpose of engaging flashbulb 2 in its socket 1, and whose lateral dimensions are less than the maximum lateral dimensions of flashbulb 2. The degree of insertion of flashbulb 2 into the socket 1 is limited by a ring 11 fixed to the flashbulb 2.

In the arrangement specifically illustrated in FIG. 1, the plane of the cutout 10 of reflector 9 substantially intersects the glass-bead or electrode support 6. By axial displacement of sleeve 8 relative to socket 1, in a direction of the arrow 12, the point of intersection of the plane of cutout 10 may be shifted into the region between the glass-bead 6 and the electrode tips 7. When the relative position of reflector 9 with respect to flashbulb 2 is as illustrated in FIG. 1, as well as when the reflector 9 is moved further outwardly of flashbulb 2, the reflecting powers obtainable in combination with the curvature of the reflector 9, and irrespective of the fact that its diameter is very small and only approximately double the minor diameter of the flashbulb envelope, are equivalent to those obtained by appreciably larger reflectors of conventional type and design with respect to the positioning of the flashbulb. By proper axial adjustment of reflector 9 relative to flashbulb 2, it is possible to obtain optimum illuminating efficiency with various types of flashbulbs.

As further illustrated in FIG. 1, the illuminating properties can be changed in the direction of an increase or correction of the reflecting power by means of a lens 13 which is preferably formed of transparent plastic material. In place of the lens 13, or, if desired, in addition to it, other optical means, such as transparent disks formed with ribs, facets, or the like, and preferably molded of plastic composition material, can be inserted into the path of the light rays.

FIG. 2 illustrates a flashbulb unit having a flashbulb and reflector arrangement incorporating the principles exemplified in FIG. 1. FIG. 2 is drawn to a scale which is substantially double that employed for FIG. 1.

In the arrangement of FIG. 2, the flashbulb 2, which is shown in broken lines, is seated in a mounting or socket 14. A support 15 for a reflector 16 is mounted on the socket 14 for axial and angular displacement relative thereto, the cutout 17 of the reflector 16 embracing the flashbulb 2 in the same manner as described in connection with FIG. 1. Reflecting surface or reflector 16 can be provided on support 15 in any desired manner. Thus, the reflector and its support may be united to each other utilizing the resiliency of the materials, by form locking, by mechanical bolting, or by adhesion. However, it is also feasible and preferable to deposit a reflecting metal layer 16, under a vacuum, onto the support 15.

The mount 14, which is preferably of dielectric material, can be formed integrally with the housing 18. Housing 18 has a plug-in branch 19 projecting therefrom, and is formed with a guide 20 for a slidable cover 21 shown in FIG. 2 in the partially closed position. When cover 20 has been completely removed from guide 20, support 15 can be displaced axially with respect to socket 14.

A reject key 22 for flashbulb 2 is mounted on the wall of housing 18 opposite to the guide 20, and a ring 23 for retaining the key 22 is position on the housing 18 also serves a mounting for a computing device for the purpose of providing the camera setting values as read from the scale rings 24 and 25. By means of suitable springs (not shown) scale rings 24 and 25, as well as reject key 22, can be maintained in their proper operative positions.

A connector cable 26 having a plug on its outer end is placed in encircling relationship with the support 15, being preferably spirally wound thereon. This connector cable is coiled in a spring-like fashion so that it may be expanded and will contract to its rest position when the expansion stress is released. On one side of the carrier 15, sufficient space is provided, in the form of a recess or the like, for the plug on the end of cable 26.

By withdrawing support 15 from socket 14, access may be obtained to the interior of the housing 18 and to electrical components therein, such as a battery 27 and a capacitor 28 shown in broken lines.

By virtue of the reduction in overall dimensions of the reflector achieved by the present invention, it is possible to provide a bank of multiple flashbulb units in a particularly convenient and advantageous manner. Thus, a number of the units can be mounted in a common housing or case, or on a common support, in any desired arrangement. For example, they may be arranged in sequence alongside each other or above each other, or in the form of a circle or a star, and the respective lamps thereof can be flashed in any desired sequence and at any desired speed.

While specific embodiments of the invention have been shown and described in detail in order to illustrate the application of the principles of the invention, it will be understood that the invention may be embodied otherwise without departing from such principles.

What is claimed is:

1. A flashbulb unit for photographic cameras, and for use with a flashbulb of the type having a base, a relatively elongated transparent envelope, of circular cross section throughout its length, extending from said base, a pair of electrodes extending longitudinally into said envelope, and a support engaging and laterally spacing said electrodes at a distance outwardly from said base and inwardly of the electrode tips: said unit comprising, in combination, a reflector having a flashbulb of such type mounted in operative relation therewith and with the longer axis of the flashbulb substantially coaxial with the reflector; a socket connected to said reflector and extending substantially centrally rearwardly therefrom and receiving the base of the flashbulb; said reflector having a central cut-out for insertion of the flashbulb therethrough and into said socket; and means limiting insertion of the flashbulb through the reflector cut-out into said socket to an extent such that the plane of the cut-out intersects the envelope of the flashbulb at a distance outwardly of said socket at least equal to the distance, outwardly of said socket, of the electrode spacing support within the flashbulb envelope; at least a portion of the envelope of the flashbulb projecting beyond the axially outer edge of said reflector; the maximum diameter of the reflector being of the order of only twice the transverse diameter of the flashbulb envelope.

2. A flashbulb unit, as claimed in claim 1, in which the lateral dimensions of the reflector cutout are less than the maximum lateral dimensions of the flashbulb envelope.

3. A flashbulb unit, as claimed in claim 1, including means providing for relative adjustment of said socket and said reflector in a direction substantially parallel to the reflector axis.

4. A flashbulb unit, as claimed in claim 3, said adjustment-providing means comprising telescopically interrelated cylindrical portions of said socket and said reflector.

5. A flashbulb unit, as claimed in claim 4, said telescopically engaged cylindrical portions of said socket and said reflector providing for relative angular adjustment of said socket and said reflector.

6. A flashbulb unit, as claimed in claim 4, said telescoping cylindrical portions of said socket and said reflector providing for relative rotation of said reflector and said socket, and the external surface of the telescoping cylindrical portion of said reflector being substantially cylindrical to form a cable drum rotatable about said socket; and a connecting cable for said unit wound on said drum.

References Cited in the file of this patent

UNITED STATES PATENTS

| | | |
|---|---|---|
| 988,824 | Sagendorph | Apr. 4, 1911 |
| 1,043,791 | Anklam | Nov. 12, 1912 |
| 1,440,552 | Pomeroy | Jan. 2, 1923 |
| 2,298,403 | Mihalyi | Oct. 13, 1942 |
| 2,525,163 | Zadig | Oct. 10, 1950 |
| 3,015,023 | Dayton et al. | Dec. 26, 1961 |

FOREIGN PATENTS

| | | |
|---|---|---|
| 266,553 | Great Britain | Mar. 3, 1927 |
| 785,493 | Great Britain | Oct. 30, 1957 |